UNITED STATES PATENT OFFICE.

CHARLES S. VADNER, OF SALT LAKE CITY, UTAH.

PROCESS OF RECOVERING ZINC FROM AN ACID SULFITE SOLUTION.

1,163,286. Specification of Letters Patent. Patented Dec. 7, 1915.

No Drawing. Application filed May 26, 1914. Serial No. 841,152.

*To all whom it may concern:*

Be it known that I, CHARLES S. VADNER, a citizen of the United States, and a resident of Salt Lake City and county, Utah, have invented a new and useful Process of Recovering Zinc from an Acid Sulfite Solution.

It is well known that in various smelting operations, in roasting ores, and in various other operations that produce sulfurous gases, that a large amount of obnoxious fumes are emitted into the air, and that these fumes and gases are a source of annoyance and injury to animal and vegetable life. While the mechanical impurities contained in these fumes can be fairly well arrested by the baghouse system, and by the use of long flues and baffles, the sulfurous fumes and gases are but partially arrested or rendered innocuous by them.

The object of my invention then is to utilize these sulfurous fumes and the contained heat, and to render them harmless to all forms of life.

Another object of my invention is to provide an effective and inexpensive method of recovering metals from ores containing them.

To accomplish these objects I make use of the heat and sulfurous gases contained in fumes; subjecting oxids, carbonates, and sufficiently roasted ores containing copper, iron, zinc, lead, arsenic, antimony, cadmium, lime, bismuth, gold and silver in the presence of a sufficient quantity of water to the action of these sulfurous gases. By this means these metals are extracted and recovered from the ores, and the fumes arrested and rendered harmless.

It will be understood that if desirable in cases where smelter fumes are not available, sulfur can be burnt in order to provide the necessary sulfurous gases for the reduction of ore and ores.

Oxids, carbonates, or sufficiently roasted ores ground to the proper size are showered or sprayed in water down through the first of a series of purification towers. These towers are of suitable size and height according to the quantity of ore to be treated, and the length of time the ore requires to be exposed. The sulfurous fumes are led into these purification towers and mingled with the sprayed ore pulp. By means of this spraying every particle of ore is subjected to the action of the sulfurous gases, which, in the presence of water effects the solution of the copper and zinc, some of the iron and arsenic, and other metals contained as aforesaid in the ore. This solution falls to the sump at the bottom of a tower while the unused gases pass on to the next tower. These towers are interposed at points in the flues where the sulfurous gases are all united and at the point from which they are finally voided. The sulfurous fumes are drawn either by natural or artificial draft from the main flue in the base of the first purification tower and by a suitable flue led down into the base of the second tower, thence up through the tower and down again to the base of the third tower, and so on throughout the series of towers, and finally out of the stack. In each tower the fumes come in contact with the sprayed ore pulp so that the sulfurous gases may have a chance to unite with the metals, and fall to the sump at the bottom. As many towers can be interposed in the path of the sulfurous fumes as may be found necessary in order to expose sufficient ore requisitely long to take from the fumes all the sulfurous gases and render them harmless enough to be voided into the air.

Where the smelter stack is built on an elevation with the flues leading thereto, and with towers interposed in succession in the path of the flues, the sprayed ore pulp can be fed again to the successive towers by gravity, otherwise it can be drawn up by pumps.

As a precaution against voiding fumes containing appreciable amounts of sulfurous gases an absorption tower containing boulders of lime rock over which trickles a solution of milk of lime is interposed between the last purification tower and the stack through which the fumes are finally voided into the atmosphere. The solution of milk of lime is returned to the top of the absorption tower by any suitable means as long as it is found efficient in neutralizing the traces of sulfurous acid that may escape from the last purification tower. The resultant calcium sulfite on exposure to the air is quickly oxidized to calcium sulfate, which can be dried, or dried and calcined, and used in the arts.

The purification towers are built over sumps into which the solution of ore and dissolved sulfurous vapors and undissolved ore fall. If the settled and undissolved portion of the ore is found to contain sufficient values it is removed from the sump and sent to the smelter, where on account of the lead, iron, gold and silver it is very desirable. The solution containing the dissolved zinc and copper, and possibly some iron and other impurities, is decanted from the settled and undissolved portion of the ore into a treatment tank having a movable sealed cover and an outlet leading back to the main flue just in front of the first purification tower. Air under pressure is forced through the solution in this tank, and the excess of sulfurous gases is thereby blown out of the solution. When the ore coming from the solution has only a faint odor, or none at all of sulfurous gas, further air treatment is stopped.

If the solution is found to contain copper it is now passed in any suitable manner over metallic iron. The copper in the solution settles to the bottom whence it may be withdrawn and purified and so become a marketable product. Instead of the use of the metallic iron the sealed cover may be removed, and the copper recovered by any suitable electrolytic method. After the copper is removed the solution is then oxidized with oxygen, chlorin gas, or any other suitable oxidizing agent, until all of the iron contained in the solution is in the ferric condition. The oxidized solution is now cooled and treated in the cold. Finely ground calcium carbonate is now added to the solution until further addition of the same causes no effervescence. By this means the whole of the iron is precipitated as ferric hydrate which will react with any arsenic present to precipitate the same along with any copper, cadmium and bismuth, antimony, lime and other metals that may have escaped previous precipitation. The solution is now allowed to settle and the sediment drawn off, washed and filtered, pressed, and if found to be of any use for its iron contents, is sent to the smelter, or worked up, if desired, for its arsenic contents, or if valueless, is thrown away. The clear solution is now treated with live steam and finely ground calcium carbonate until the solution becomes neutral and the zinc in the course of two to four hours treatment is all precipitated in the form of carbonates together with some lime. The solution is then settled and decanted. The precipitate is washed, decanted and drained off onto a draining floor and dried, when the zinc can be recovered by any suitable smelting method and also as a product. By effecting a solution of said carbonate of zinc by exposing same to the action of sulfurous gases in any of the purification towers, the precipitated carbonate of zinc may be dissolved and the solution drawn off into any suitable treatment tank and the excess of sulfurous gases blown, eliminated by steam, air and other suitable means, and the zinc recovered in any suitable manner by electrolyzing the solution, the excess acidity developed during the progress of electrolysis being overcome by the addition as may be necessary of the suitably pulverized carbonates, oxids and hydrates of zinc, calcium, barium, strontium, magnesium, potassium, and sodium. A mixture of same can also be used along with heat, air, steam, and also a combination of said agencies can be used.

The recovery of zinc by electrolysis offers big advantages from a sulfite solution over that of a sulfate solution; much less electricity is required, consequently less cost of production, together with the further advantage of being able to regulate cheaply and at will the acidity of this solution at any stage of the process, and of recovering the eliminated acidity for re-use on other ores.

Electricity, heat, air, steam, or a combination of said agents may be used for the recovery of said $SO_2$ gas from both solutions and minerals and salts.

The addition of soluble salt and minerals of zinc, especially the carbonate and carbonates of zinc along with that of lime and others, as aforementioned, during the progress of the recovery of the zinc by electrolysis, renders the recovery of the zinc continuous, besides reducing the acidity of the solution.

The carbonates above mentioned can be used separately or in combination.

Where copper, zinc, silver and gold are extracted and eliminated, the addition of soluble chlorids, one or more, (the presence of which favors the solution of the above enumerated metals in the sulfurous solution, either by their own solvent powers or due to their presence in preventing secondary reactions from taking place that would tend to render the operation of the process more expensive, or in some cases, prohibitive) is desirable, and, when found to be necessary, is made. I would not desire to limit myself to the above numerated metals, but would use one or more, either separately or in combination, of the common, soluble chlorids, such as sodium chlorid, magnesium chlorid, calcium chlorid, ferrous and ferric chlorid and cuprous and cupric chlorid, in operating the process, either in the commencement of same, or at any stage, where the use of one or more of such chlorids would be advantageous in the extraction of any and all of the aforesaid metals from their ores.

The solution of the ore, as may be, having been satisfactorily accomplished, either with or without the use of one or more of the soluble chlorids mentioned above, is separated from the insoluble residue by decantation or infiltration into suitable containers and the excess of sulfurous gases is gotten rid of either by heat, steam or air, and the surplus acidity of the solution due to acid salts, free acid or otherwise, neutralized, partially or wholly as may be necessary, with the carbonates, oxids and hydrates of calcium, magnesium, sodium, potassium, or with a mixture of same, as may be possible.

When iron is present, the solution is partially neutralized and oxidized or not, as desired, with air, chlorin or any other suitable oxidizing agent. The solution, hot or cold, is then exposed in any suitable manner to the action of compressed air, oxygen, or a combination of the two. The iron contained in said solution can thus be partially or wholly precipitated as a brownish-red, pulverulent powder, $Fe_2O_3$ (ferric oxid), at will, by the operator, simply by regulating: 1st, the acidity of the solution; 2nd, the length of time of the treatment of the solution with air or oxygen; 3rd, the degree of strength of the solution of the soluble chlorids; especially while using sodium chlorid, calcium chlorid, or a mixture of the soluble chlorids; 4th, the temperature of the solution; 5th, the condition of the iron after it has been leached out of the ore and while in the leaching medium. Thus

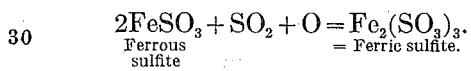
Ferrous sulfite                = Ferric sulfite.

The neutralizing agents added, take no part in the reaction, merely reducing the acidity of the solution thus:

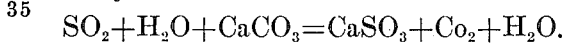

Freshly precipitated ferric oxid is soluble in moderately strong acid solution, hence the necessity of reducing the acidity in order to obtain the precipitate.

In case the ores contain arsenic and it is desired to eliminate and recover it, a different method for precipitating the iron is used. The solution of the ore is effected and the excess of $SO_2$ gas is gotten rid of as above mentioned and the solution is oxidized or not, as may be desired, by a suitable oxidizing agent, and the iron is precipitated as ferric hydrate $Fe_2(OH)_6$ by the addition of a sufficient amount of the oxids, carbonates or hydrates, of barium, calcium, strontium, magnesium, sodium or potassium, and mixtures of these can also be used. When the iron is precipitated in this form, the ferric hydrate $Fe_2(OH)_6$ formed, has the power of uniting with the arsenic present and forming either ferric arsenite or ferric arsenate, as may be, which is precipitated and removed by filtration or other suitable ways from the solution.

Antimony, silver, gold, lead, bismuth, cadmium and other known metals that would be found dissolved in such a solution, depending of course on the contents of the ore or ores being treated, can be precipitated as above described and recovered if found to be desirable; this method of eliminating and purifying the solution of any and all undesirable metals as aforementioned can be used, whether the iron is eliminated and recovered by the first or second mentioned method, and also when a combination of the two methods is necessary to effect an elimination of the above mentioned metals for the purpose of purifying the solution. It is well understood that any and all steps in this process can be carried out in the presence of heat or cold, as may be most advantageous. Copper is eliminated by passing the solution, hot or cold, in any suitable manner over metallic iron. The condition of the solution as to the amount of free acid and state of oxidization can be regulated to suit the best purpose of the application of the process. The copper and silver can also be precipitated as a basic carbonate by the suitably pulverized carbonates of the alkalis, alkaline earth or a mixture of same with or without the use of air; and in the cold.

The precipitate is separated by filtration and other suitable means and the copper, silver and other contained metals, as may be, are recovered by electrolyzing the hot or cold solution in suitable containers. The excess acidity of the solution due to the decomposition of the sulfites is gotten rid of, both by heat and also by the carbonates of the alkalis, alkaline earths or a mixture of same used in effecting the precipitation of the copper. Sulfites are formed which may precipitate out of the solution and which can be separated, and $SO_2$ gas and their valuable basic contents recovered therefrom. A current of air will also assist in reducing the acidity of the solution. The formation of calcium sulfate, due to oxidization is effective in reducing said acidity, and any such sulfate formed can be separated and recovered for use.

It is my intention of effecting the functioning of this process for the purpose of cheapness of operation, by: 1st: using $SO_2$ gas and water; 2nd: using $SO_2$ gas, water and heat; 3rd: using $SO_2$ gas, water and a soluble chlorid, and a mixture of soluble chlorids as aforementioned, along with heat when necessary, or by using a mixture of soluble chlorids; 4th: using the above means separately, in part, or in combination, also using the soluble chlorids mentioned separately, in part, or in combination for the purpose of extracting the metals aforementioned. The strength of the solution in soluble chlorids will vary from 5% to 20% as may be.

The solution being freed from the aforementioned metals as may be and in the manner described for the best purposes of the application of the process, the zinc is precipitated from the cold solution by the means of the suitably pulverized oxids, carbonates, hydrates of barium, calcium, strontium, magnesium, sodium, potassium, or a mixture of same can be used, and the basic precipitate of zinc is separated by filtration or otherwise and calcined to the oxid, smelted or dissolved in any suitable manner in a solution of $SO_2$ and water with or without heat and electrolyzed in any suitable manner, whereby the zinc is recovered in metallic form; the precautions for the removal of the acidity of the solution and recoveries of the by-products, as in the elimination of copper being duly observed.

Having described my process, what I claim is new and wish to secure by Letters Patent is:—

1. The process of recovering zinc from an acid sulfite solution which consists in electrolyzing the solution, partially neutralizing with a reagent that can partially neutralize the acid that may be formed and continuously electrolyzing for the recovery of the zinc and elimination of the $SO_2$ gas.

2. The process of recovering zinc from an acid sulfite solution which consists in electrolyzing the solution, partially neutralizing the solution with the carbonate of a metal and continuously electrolyzing for the recovery of the zinc and elimination of $SO_2$ gas.

3. The process of recovering zinc from an acid sulfite solution which consists in electrolyzing the solution, meanwhile partially neutralizing the solution during the progress of the electrolysis with a basic carbonate of zinc and lime and continuously electrolyzing the solution for the recovery of the zinc.

4. The process of recovering zinc from an acid sulfite solution consisting in electrolyzing the solution, meanwhile partially neutralizing any acid that may be formed with compounds of lime and zinc and continuously electrolyzing the solution for the recovery of the zinc and elimination of the $SO_2$ gas.

5. The process of recovering zinc from an acid zinc sulfite solution which consists in electrolyzing the solution and neutralizing the acid as fast as formed.

In witness whereof, I have hereunto set my hand in the presence of two subscribing witnesses.

CHARLES S. VADNER.

Witnesses:
F. C. WALKER,
DALE FOOTE.